(12) United States Patent
Schumacher et al.

(10) Patent No.: US 10,369,950 B2
(45) Date of Patent: Aug. 6, 2019

(54) MONITORING DEVICE FOR AT LEAST ONE IGNITION CIRCUIT FOR A PERSONAL PROTECTION MEANS FOR A VEHICLE, AND METHOD FOR OPERATING A MONITORING DEVICE

(71) Applicant: Robert Bosch GmbH, Stuttgart (DE)

(72) Inventors: Hartmut Schumacher, Freiberg (DE); Ruediger Karner, Kornwestheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 215 days.

(21) Appl. No.: 15/526,094

(22) PCT Filed: Oct. 27, 2015

(86) PCT No.: PCT/EP2015/074884
§ 371 (c)(1),
(2) Date: May 11, 2017

(87) PCT Pub. No.: WO2016/096213
PCT Pub. Date: Jun. 23, 2016

(65) Prior Publication Data
US 2017/0327067 A1 Nov. 16, 2017

(30) Foreign Application Priority Data
Dec. 16, 2014 (DE) .................. 10 2014 225 960

(51) Int. Cl.
*B60R 21/017* (2006.01)
*B60R 21/01* (2006.01)
(52) U.S. Cl.
CPC ............ *B60R 21/017* (2013.01); *B60R 21/01* (2013.01); *B60R 21/0173* (2013.01); *B60R 2021/01184* (2013.01); *B60R 2021/01286* (2013.01)

(58) Field of Classification Search
CPC ... B60R 21/017; B60R 21/01; B60R 21/0173; B60R 2021/01184; B60R 2021/01286
See application file for complete search history.

(56) References Cited

U.S. PATENT DOCUMENTS 7,142,407 B2 * 11/2006 Sibrai ................ B60R 21/0173
361/247
2005/0225924 A1 * 10/2005 Sibrai ................ B60R 21/0173
361/247

FOREIGN PATENT DOCUMENTS

EP 1582417 A1 10/2005
JP H068120 U 2/1994
(Continued)

OTHER PUBLICATIONS

International Search Report dated Jan. 14, 2016, of the corresponding International Application PCT/EP2015/074884 filed Oct. 27, 2015.

*Primary Examiner* — Anne M Antonucci
(74) *Attorney, Agent, or Firm* — Norton Rose Fulbright US LLP; Gerard Messina

(57) ABSTRACT

A monitoring device for an ignition circuit for a personal protection device for a vehicle. The ignition circuit activates the personal protection device when an ignition voltage is present that exceeds a voltage threshold value and/or an ignition current is present that exceeds a current threshold value. The monitoring device has a control device and a voltage source connected via a voltage source terminal of the control device. The control device is connected via a high-side ignition circuit terminal to a first supply terminal of the ignition circuit and via a low-side ignition circuit terminal to a second supply terminal of the ignition circuit. The monitoring device is fashioned such that a no-load voltage of a high-side current source of the control device situated between the voltage source terminal and the high-
(Continued)

side ignition circuit terminal corresponds at least to the voltage threshold value.

16 Claims, 5 Drawing Sheets

(56) References Cited

FOREIGN PATENT DOCUMENTS

| | | |
|---|---|---|
| JP | H10505806 A | 6/1998 |
| JP | H11332131 A | 11/1999 |
| JP | 2000009781 A | 1/2000 |
| JP | 2012062032 A | 3/2012 |

* cited by examiner

MONITORING DEVICE FOR AT LEAST ONE IGNITION CIRCUIT FOR A PERSONAL PROTECTION MEANS FOR A VEHICLE, AND METHOD FOR OPERATING A MONITORING DEVICE

FIELD

The present invention relates to a monitoring device for at least one ignition circuit for a personal protection device for a vehicle, to a corresponding method for operating a monitoring device, to a corresponding control device, and to a corresponding computer program.

BACKGROUND INFORMATION

Occupant protection systems have an ignition circuit system that has at least one ignition circuit for activating a restraint device. Today's ignition circuit monitoring is made up of shunt detection at the supply terminals of the ignition circuit, and a resistance measurement of the ignition circuit loop. In addition, a coupling test is implemented in order to recognize whether an ignition circuit is coupled to another ignition circuit or to other inputs/outputs of control devices.

An object of the present invention is to further improve the existing art, and to integrate it in the ignition circuit or system ASICs in a manner that uses less space.

SUMMARY

The present invention provides a monitoring device for at least one ignition circuit for a personal protection device for a vehicle, as well as a method for operating the monitoring device that uses the monitoring device for at least one ignition circuit for a personal protection device for a vehicle, to a corresponding control device that uses the method, and, finally, to a corresponding computer program. Advantageous embodiments are described herein.

Through at least one current source having a no-load voltage equal to or greater than a real maximum ignition voltage, in an overall voltage range of an ignition circuit activation errors can be recognized that first occur when a relevant voltage threshold is exceeded, such as contact oxides, vehicle voltages coupled via diodes, or protection elements.

A monitoring device is provided for at least one ignition circuit for a personal protection device for a vehicle, the at least one ignition circuit being fashioned to activate the personal protection device when an ignition voltage is present that exceeds a voltage threshold value, and/or an ignition current is present that exceeds a current threshold value, the monitoring device having a control device and a voltage source connected via a voltage source terminal of the control device, the control device being connected to a first supply terminal of the ignition circuit via a high-side ignition circuit terminal, and being connected to a second supply terminal of the ignition circuit via a low-side ignition circuit terminal, characterized in that the monitoring device is fashioned such that a no-load voltage of a high-side voltage source of the control device, situated between the voltage source terminal and the high-side ignition circuit terminal, corresponds at least to the voltage threshold value, and in particular that the no-load voltage corresponds at least to a maximum ignition voltage of the ignition circuit.

A vehicle can have a personal protection device such as an airbag or a safety belt. The personal protection device can be activated via an ignition circuit. In the ignition circuit, an ignition tablet can be activated or ignited when an applied power is present that exceeds a specified threshold value. The monitoring device can be realized as an integrated electric circuit, or as a so-called system ASIC. The control device of the monitoring device can be realized as an integrated electric circuit, an application-specific integrated circuit, or as a so-called system ASIC. Thus, the monitoring device can be understood as an ignition circuit monitoring unit or as an expanded ignition circuit monitoring unit. The voltage source terminal, a voltage sink terminal, the high-side ignition circuit terminal, and the low-side ignition circuit terminal can be understood as terminals, terminal pins, ASIC pins, or interfaces of the monitoring device or of the control device. The voltage source can be understood as an energy reserve or as a polarity reversal-protected energy reserve voltage. The voltage source can be fed from an on-board electrical network of the vehicle. The voltage source can provide a voltage of at least 24 V, in particular at least 30 V, in particular at least 42 V. The voltage source can provide a voltage in a range from 24 V to 42 V. The ignition circuit has a first supply terminal and a second supply terminal. The first supply terminal can be understood as an ignition circuit terminal, a ZK1+ terminal, an ignition circuit plus terminal, or an ignition circuit plus control device terminal. The second supply terminal can be understood as an ignition circuit terminal, a ZK1− terminal, an ignition circuit minus terminal, or an ignition circuit minus control device terminal. A high-side multiplexer can be situated between the high-side ignition circuit terminal and the high-side current source.

It is also advantageous if the no-load voltage of the high-side current source is at least 26 V, in particular at least 30 V, in particular at least 36 V, in particular at least 42 V. Thus, the voltage between the high-side ignition circuit terminal and the low-side ignition circuit terminal can be at least 26 V, in particular at least 30 V, in particular at least 36 V, in particular at least 42 V. Advantageously, a contact connection that has become impaired by oxide layers in the ignition circuit can be improved, because an oxide breakdown can be enabled.

The monitoring device can have a current source control device that is fashioned to control a temporal course of a current rise of the high-side current source during the transition from a first current level to a second current level, corresponding to a predefined transition shape. The current source control device can be understood as a first current source control device or a high-side current source control device. In particular, the current source control device can control the temporal course of the current rise corresponding to a transition shape having a curve of a "raised cosine." In this way, an edge shaping of the measurement current impulse can easily take place. In this way, the temporal course of the current rise corresponding to a raised cosine filter, also referred to as a cosine rolloff filter, can be used to shape the measurement current. Thus, the temporal course of the current rise can meet the first Nyquist condition. Advantageously, a radiation or an EMV characteristic of the monitoring device can be improved by the stepped increasing of the measurement current.

In addition, the monitoring device can have a filter device for filtering at least one measurement voltage (in particular between the high-side ignition circuit terminal and the low-side ignition circuit terminal). In particular, the filter device can include at least one low-pass filter. In this way, measurement imprecision, for example due to switching processes and/or charging of capacitors or inductors of the device, can be avoided, or its effect can be reduced.

The monitoring device can include an analog-digital converter that is connected to an instrument amplifier via an ADC multiplexer. The analog-digital converter can be used with the ADC multiplexer to measure a voltage over a low-pass filter between the high-side ignition circuit terminal and the low-side ignition circuit terminal for the at least one ignition circuit, and between an ignition circuit amplifier terminal and analog ground terminal, or between an offset terminal and the analog ground terminal.

A current limiting resistor can be situated between the voltage source and the voltage source terminal. A current limiting resistor can be situated between the ground terminal and a voltage sink terminal. The current limiting resistors can be situated externally to the control device. In this way, security against errors of the monitoring device can advantageously be improved.

The monitoring device can in addition have a switchable high-side terminating resistor, and, in addition or alternatively, a switchable low-side terminating resistor. In particular, the switchable high-side terminating resistor can be situated between an output of a high-side multiplexer connected to the high-side current source and the voltage sink terminal, and, in addition or alternatively, the switchable low-side terminating resistor can be situated between an output of a low-side multiplexer connected to the low-side ignition circuit terminal and the voltage sink terminal. Advantageously, the precision of the measurement can be improved if the terminating resistors are disconnected during the measurement. In this way, an offset of the monitoring device can be determined or compensated through a resistor reference measurement to ground.

The monitoring device can in addition have a switchable high-side voltage divider and, in addition or alternatively, a switchable low-side voltage divider. In particular, the switchable high-side voltage divider can be situated between an output of a high-side multiplexer connected to the high-side current source and an ADC multiplexer connected to an analog-digital converter, and, in addition or alternatively, the switchable low-side voltage divider can be situated between an output of a low-side multiplexer connected to the low-side ignition circuit terminal and the ADC multiplexer. In this way, a calibration of the monitoring device can take place using technically simple means.

An example method in accordance with the present invention for operating a variant of a monitoring device is provided, the method having at least the following steps:

connection of the high-side ignition circuit terminal to the high-side current source, and connection of the low-side ignition circuit terminal to a voltage sink terminal;

activation of the high-side current source;

determining a difference voltage signal between the high-side ignition circuit terminal and the low-side ignition circuit terminal; and ascertaining an ignition circuit resistance using the difference voltage signal.

An object of the present invention can also be achieved quickly and efficiently by this variant embodiment of the present invention in the form of a method.

Present invention also provides a control device that is fashioned to carry out, control, or realize the steps of a variant of a method presented here in corresponding devices. The underlying object of the present invention can also be achieved quickly and efficiently by this variant embodiment of the present invention in the form of a control device. The control device can be a part of the control device described above, or can be connected thereto.

A control device can be understood in the present context as an electrical device that processes sensor signals and, as a function thereof, outputs control signals and/or data signals. The control device can have an interface that can be fashioned as hardware and/or as software. In the case of a realization as hardware, the interfaces can for example be part of a so-called system ASIC that contains a wide variety of functions of the control device. However, it is also possible for the interfaces to be separate integrated circuits, or to be made up at least partly of discrete components. In the case of a realization as software, the interfaces can be software modules present alongside other software modules on a microcontroller.

Also advantageous is a computer program product or computer program having program code that can be stored on a machine-readable bearer or storage medium such as a semiconductor memory, a hard drive, or an optical memory, and that is used for the execution, realization, and/or controlling of the steps of the method according to one of the specific embodiments described above, in particular when the program product or program is executed on a computer or on a device.

In other words, current sources having no-load voltages equal to or greater than the real maximum ignition voltages can be used in order to recognize, in the entire voltage range of an ignition circuit activation, all error types that would first become recognizable when a relevant voltage threshold was exceeded, or contact oxides, vehicle voltages coupled via diodes, protection elements, etc. Advantageously, relevant control device-external shunts on the ignition circuits can be recognized, and thus control device-internal errors can be avoided when checking the ignition circuit output stages. An exchanging of a control device due to an external error can be avoided. In addition, oxidized contacts in the shunt can be recognized, and thus failure in the case of activation can be avoided. Errors in the ignition circuit measurement, and unreliable ignition in the case of activation due to oxidized contacts in the ignition loop, can be avoided. Short circuits to decoupled (diode) voltages, which could cause failure in the case of activation, can be recognized.

A radiation of the monitoring device can be improved by a flank shaping (raised cosine) of the measurement current pulse. The radiation can be improved by a stepwise increase of the measurement current. Advantageously, a resistance to interference can be increased by a central filtering of the measurement voltages. Advantageously, the security of the ignition circuit measurement against errors of its own measurement device, and subsequent false triggering, can be improved by an ASIC-external current limiting at the high side and low side with integrated monitoring. The precision of the ignition circuit resistance measurement can be improved by disconnecting terminating resistances or dividers at the ignition circuits during the measurement. Likewise, through the additional use of a resistance reference measurement to ground, the offset in the measurement device can be compensated. By including an ignition circuit printed conductor (go and return line) equivalent to the connection of the ASIC ignition circuits to the device plug on the circuit board in the fine calibration of the ASIC resistance measurement, the precision can be compensated despite the high-ohmic connection of the ignition circuits with narrow (100 to 200 μm wide) printed conductors in the inner layers of more compact designs.

The present invention is explained in detail below on the basis of the figures.

DETAILED DESCRIPTION OF EXAMPLE EMBODIMENTS

Figure 1:
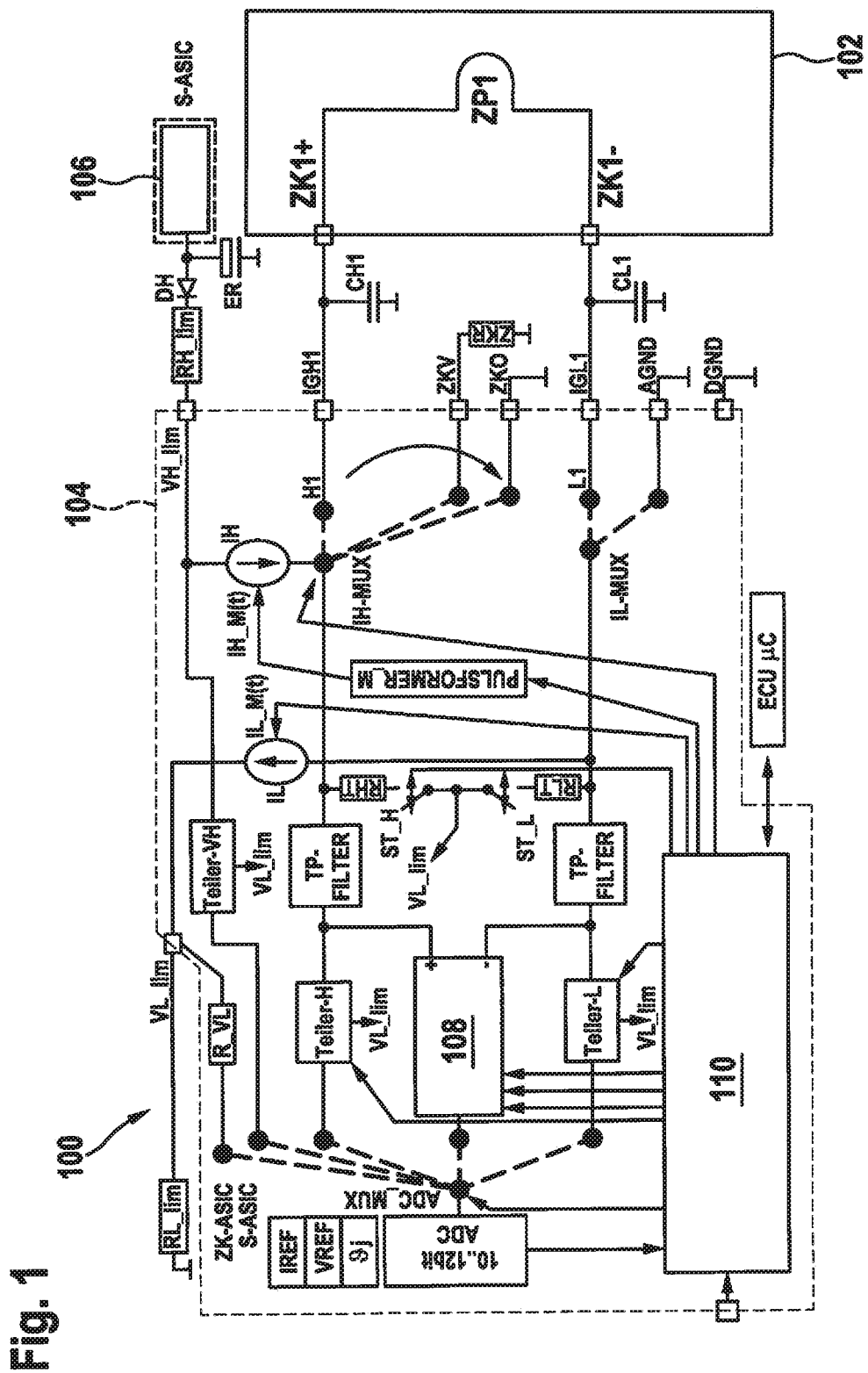
FIGS. 1 through 4 each show a simplified circuit diagram of an ignition circuit monitoring system according to an exemplary embodiment of the present invention.

In the description below of advantageous exemplary embodiments of the present invention, identical or similar reference characters are used for the elements shown in the various Figures having similar function, and repeated description of these elements is omitted.

FIG. 1 shows a simplified circuit plan of a monitoring device 100 according to an exemplary embodiment of the present invention. Monitoring device 100 is a monitoring device 100 for an ignition circuit 102 for a personal protection device for a vehicle, thus also referred to hereinafter as ignition circuit monitoring. FIG. 1 shows the schematic design of an ignition circuit resistance measurement system for an individual ignition circuit 102 as an integrated solution of an airbag ignition circuit ASIC or airbag system ASIC. Ignition circuit 102 is fashioned to activate the personal protection device when an ignition voltage is present that exceeds a voltage threshold value and when an ignition current is present that exceeds a current threshold value, i.e., when an ignition power is present that exceeds a power threshold value.

Monitoring device 100 includes at least one control device 104 and a voltage source 106 connected via a voltage source terminal VH_lim of control device 104. The control device has at least voltage source terminal VH_lim, a high-side ignition circuit terminal IGH1, a low-side ignition circuit terminal IGL1, an ignition circuit amplifier terminal ZKV, an offset terminal ZKO, an analog ground terminal AGND, and a digital ground terminal DGND as interfaces. Control device 104 is connected via high-side ignition circuit terminal IGH1 to a first supply terminal ZK1+ of ignition circuit 102 and is connected via low-side ignition circuit terminal IGL1 to a second supply terminal ZK1− of ignition circuit 102.

As part of control device 104, a high-side current source IH is situated between the voltage source terminal VH_lim and high-side ignition circuit terminal IGH1. Here, a no-load voltage of high-side voltage source IH corresponds to at least the voltage threshold value. In an advantageous exemplary embodiment, the no-load voltage of high-side voltage source IH corresponds to at least a maximum ignition voltage of the ignition circuit.

Ignition circuit 102 that is to be measured has a first supply terminal ZK1+ and a second supply terminal ZK1−. These are connected, via control device printed conductors, to the corresponding high-side ignition circuit terminal IGH1 and low-side ignition circuit terminal IGL1 of control device 104. Besides a previously known (control device 102) internal ignition circuit reference resistor ZKR, which is connected to the ignition circuit amplifier terminal ZKV (ASIC pin ZKV) to ground for the automatic fine calibration of the linear measurement current source tolerance of current sink IL and for the amplification of the measurement channel (instrument amplifier), additional offset terminal ZKO (ASIC pin ZKO) is directly connected to the control device ground in order to avoid offset errors of the instrument amplifier.

High-side current source IH is supplied via current-limited voltage source terminal VH_lim. Current-limited voltage source terminal VH_lim is also designated as terminal for high-side current source IH. For current limiting, a current limiting resistor RH_lim, external to the control device, or ASIC-external resistor RH_lim, is connected to the highest airbag voltage VER of energy reserve 106. This resistor limits the current from airbag voltage VER via a defective high-side current source IH against a shunt, in particular at ignition circuit 102.

Voltage VER is the charge voltage of the energy reserve, from which, in the case of ignition, via an ASIC-external safety semiconductor (e.g., switching transistor) the energy is provided for activating one or more ignition circuits via high-side and low-side output stages (not shown in FIG. 1) per ignition circuit (generally, components of the system ASIC). High-side output stage 1 is connected to IGH1, and low-side output stage 1 is connected to IGL1.

A current sink IL is connected via voltage sink terminal VL_lim to control device ground terminal Steuergerät-GND via an ASIC-external resistor RL_lim. This resistor limits the current caused by a shunt at ignition circuit 102 against a positive vehicle voltage in the case of a defective current sink IL. The temporal course of the current rise in the transition from a first current level to a second current level of high-side current source ICH is specified as a raised cosine shape by a current source control device Pulsformer_H. The setting of the measurement current can take place in small steps using for example an 8-bit-wide current programming.

A high-side multiplexer IH-MUX connects high-side current source IH to high-side ignition circuit terminal IGH1 for the resistance measurement in ignition circuit 102, and to ignition circuit amplifier terminal ZKV, as well as to offset terminal ZKO, for calibrating the measurement device. A low-side multiplexer IL-MUX connects current source (current sink) IL to low-side ignition circuit terminal IGL1 for the resistance measurement in ignition circuit 102, and to analog ground terminal AGND for calibrating the measurement device.

A first ignition circuit capacitor CH1, connected to ground, is coupled to the connection between high-side ignition circuit terminal IGH1 and first supply terminal ZK1+. A second ignition circuit capacitor CL1, connected to ground, is coupled to the connection between low-side ignition circuit terminal IGL1 and second supply terminal ZK1−.

An IH-MUX output of high-side multiplexer IH-MUX can be connected to voltage sink terminal VL_lim via a switchable terminating resistor RHT (5 kiloohm . . . 20 kiloohm). In this way, charges coupled in before the ignition circuit measurement are discharged to ignition circuit capacitors CH1/CL1. A measurement error caused by the increased tolerance of integrated resistors that are not calibrated is remedied by disconnecting switchable terminating resistor RHT using switch ST_H.

An IL-MUX output of low-side multiplexer IL-MUX can be connected to voltage sink terminal VL_lim via a switchable terminating resistor RLT (5 kiloohm . . . 20 kiloohm). In this way, charges coupled in before the ignition circuit measurement can be discharged to ignition circuit capacitors CL1/CH1. A measurement error caused by the increased tolerance of integrated resistors that are not calibrated is remedied by disconnecting switchable terminating resistor RLT using switch ST_L.

For the digitization of the measurement voltages, an analog-digital converter ADC is provided that, via an ADC multiplexer ADC_MUX, acquires the various voltages, in particular the voltages of an instrument amplifier 108, for measuring the voltage between high-side ignition circuit terminal IGH1 and low-side ignition circuit terminal IGL1- for ignition circuit 102, and between ignition circuit amplifier terminal ZKV and analog ground terminal AGND, or between offset terminal ZKO and analog ground terminal AGND for the fine calibration of amplification and OFFSET via a low-pass filter TP-FILTER.

In an exemplary embodiment, instrument amplifier 108 includes a low-pass filter. In a variant, instrument amplifier 108 includes at least three operational amplifiers.

To determine the integrity of current limiting resistors RH_lim and RL_lim, the voltages present at voltage source terminal VH_lim and at voltage sink terminal VL_lim are connected to ADC multiplexer ADC_MUX via voltage divider Teiler_VH, or integrated protection resistor R_VL.

Shown are ground terminals of control device 102, which as a rule are made up of one or more digital ground terminals DGND and one or more analog ground terminals AGND. Not shown is a clock input for the digital state machines. Not shown are the supply voltages of the ASIC assemblies that may be required, depending on the ASIC process.

Also shown are the voltage dividers, which can be disconnected, Teiler_H, Teiler_I, for acquiring the voltage level at first supply terminal ZK1+ to ground, or second supply terminal ZK1− to voltage sink terminal VL_lim for low-side current sink IL (limited reference ground). Also shown are important known blocks such as reference current production (for example for the current sources), reference voltage production (for example for analog-digital converter ADC), and ASIC temperature acquisition for compensating temperature effects.

In the exemplary embodiment shown in FIG. 1, control device 104 includes a control device 110, also designated digital block 110 hereinafter. Control device 110 provides a semiautomatic ignition circuit measurement controlling, measurement value processing, and error recognition. At least one measurement entry, a measurement result, and a programming of the method steps to be carried out can be stored in a region of control device 110. Here, in an exemplary embodiment control device 110 can be connected via an SPI bus to a microcontroller μC external to control device 110, or control device microcontroller ECU-μC, in order to receive measurement tasks therefrom and to transmit measurement results thereto.

Shown is the overall digital block 110, which has an interface to a control device-internal microcontroller μC. Digital block 110, or digital block 110 together with microcontroller μC, is also designated control device 110, ASIC controlling 110, or ASIC measurement value processing 110. After the initial programming, this carries out the ignition circuit measurement automatically.

In an exemplary embodiment, a cycle of an ignition circuit resistance measurement at ignition circuit 102 or ZK1 is as follows:

Terminating resistor RHT is connected to control device ground terminal ECU-GND via switch ST_H.
Terminating resistor RLT is connected to control device ground terminal ECU-GND via switch ST_L.
There then follows a waiting time of for example 5 ms.
ASIC controlling 110 sets multiplexer IH-MUX at high-side ignition circuit terminal IGH1.
ASIC controlling 110 sets multiplexer IL-MUX at low-side ignition circuit terminal IGL1.
ASIC controlling 110 sets multiplexer ADC-MUX at instrument amplifier 108.
Current sink IL is activated and is programmed for a current limiting to voltage sink terminal VL_lim of 60 mA.
High-side current source IH is activated and the current is increased in steps with a raised cosine edge, in for example 10 steps of for example 5 mA, to 50 mA. The step width is for example 100 μs.
After reaching the final measurement current strength of 50 mA, terminating resistors RHT, RLT are disconnected by switches ST_H, ST_L.
Voltage divider Teiler_H and voltage divider Teiler_L are disconnected from the limited reference ground, or voltage sink terminal VL_lim.
There then follows a waiting period of for example 1 ms (as a function of the low-pass cutoff frequency in the measurement chain).
The difference voltage signal between high-side ignition circuit terminal IGH1 and low-side ignition circuit terminal IGL1 is now supplied to instrument amplifier 108, via low-pass filter TP-FILTER, with a gain of for example six (that is, sixfold amplification), and the amplified and newly low-pass-filtered output signal is supplied to analog-digital converter ADC.
alog-digital converter ADC transmits the digital measurement value to the measurement value register of ASIC measurement value processing unit 110.

While the measurement value processing is running, the measurement of the next ignition circuit resistor can already be started. With the knowledge of the measurement current strength of the amplification of instrument amplifier 108, ASIC measurement value processing unit 110 calculates the ignition circuit resistance from the analog-digital converter signal (ADC signal).

For Example:

ADC−measurement value=400 digits; given an ADC reference voltage of for example 3.75 V and a 10-bit analog-digital converter ADC, this yields 3.666 mV/digit. Thus, 400 digits corresponds to a voltage of 1466.4 mV. With a sixfold amplification, the voltage difference between high-side ignition circuit terminal IGH1 and low-side ignition circuit terminal IGL1 is 244.4 mV. Given a nominal measurement current of 50 mA, this yields a resistance in the ignition circuit of n=4.888 ohms.

The measurement precision can be improved by a fine calibration preceding the measurement.

Fine Calibration Procedure, Step 1:

ASIC control unit 110 sets multiplexer IH-MUX at ignition circuit amplification terminal ZKV.
ASIC control unit 110 sets multiplexer IL-MUX at analog ground terminal AGND.
ASIC control unit 110 sets ADC multiplexer ADC-MUX at the instrument amplifier.
High-side current source IH is activated and is set to the target value, for example 50 mA.
Terminating resistors RHT, RLT are disconnected by switches ST_H, ST_L.
Voltage dividers Teiler_H and Teiler_L are disconnected from the limited reference ground, or voltage sink terminal VL_lim.

There then follows a waiting period of for example 1 ms (as a function of the low-pass cutoff frequency in the measurement chain).

The difference voltage signal between the ignition circuit amplifier terminal ZKV and analog ground terminal AGND is now supplied to instrument amplifier 108, via low-pass filter TP-FILTER, with for example sixfold amplification, and the amplified and again low-pass-filtered output signal is supplied to analog-digital converter ADC.

The ADC measurement value is stored as value 1 (ADC_MW1).

ADC measurement value 1 (ADC_MW1) now represents essentially the following:

$$IH \times ZKR \times V + OFFSET$$

where IH=measurement current, approximately 50 mA; V=amplification of the amplification chain, approximately 6; OFFSET of the amplification chain is approximately 20 mV; ZKR=ignition circuit reference resistance.

Fine Calibration Procedure, Step 2:

ASIC control unit 110 sets multiplexer IH-MUX at offset terminal ZKO.

ASIC control unit 110 sets multiplexer IL-MUX at analog ground terminal AGND.

ASIC control unit 110 sets multiplexer ADC-MUX at instrument amplifier 108.

High-side current source IH is activated and is set to the target value of for example 50 mA.

Terminating resistors RHT, RLT are disconnected, by switches ST_H, ST_L, from the limited ground reference, or voltage sink terminal VL_lim.

Voltage dividers Teiler_H and Teiler_L are disconnected from the limited ground reference, or voltage sink terminal VL_lim.

There subsequently follows a waiting time of for example 1 ms (as a function of the low-pass cutoff frequency in the measurement chain).

The difference voltage signal between offset terminal ZKO and analog ground terminal AGND is now supplied, via low-pass filter TP-FILTER, to instrument amplifier 108, with for example sixfold amplification, and the amplified and newly low-pass-filtered output signal is supplied to analog-digital converter ADC.

The ADC measurement value is stored as value 2 (ADC_MW2).

ADC measurement value 2 (ADC_MW2) now represents essentially the following: OFFSET (OFFSET of the amplification chain, approximately 20 mV). Through mathematical operation, from the values ADC_MW1 and ADC_MW2 and the known reference resistance ZKR, for example 10 ohms, the following results: [ADC_MW1−ADC_MW2]/ZKR=[IH×ZKR×V+OFFSET−OFFSET]/ZKR=IH×V.

Each resistance measurement can now be finely calibrated using the now-obtained quantities "OFFSET" and "overall amplification" IH×V. In the above example, the ignition circuit resistance measurement value (without calibration) is 400 digits, corresponding to 4.88 ohms.

With fine calibration parameters OFFSET=5 digits; IH×V=315 mA, there follows: 400 digits−5 digits=395 digits; corresponds to 1448 mV. From this there follows: 1448 mV/315 mA=4597 ohms.

The measurement value processing checks the result against the maximum permissible ignition circuit resistance and against the minimum permissible ignition circuit resistance. If the boundaries are not maintained, the error processing unit produces an item of error information for the requesting microcontroller μC. If, due to ambient influences, the contact connections in the ignition circuit have become impaired by oxide layers, then in the present exemplary embodiment when high-side current source IH is connected the field strength at the high-ohmic oxide layer is increased, because the no-load voltage of high-side current source IH can reach approximately a voltage VER−3V, i.e. greater than 30 V (>=30 V) when there are no, or small, current values, despite upstream resistor RH_lim (current limiting resistor RH_lim). The high field strength enables an oxide breakdown, and the current-limited operation that is used avoids contact damages in the current channel that opens. Contact errors are repaired through cyclical repetition of the measurement process.

For monitoring current limiting resistors RH_lim and RL_lim, for each ignition circuit resistance measurement, or for a reduced number of these measurements, in addition to the difference voltage measurement between high-side ignition circuit terminal IGH1 and low-side ignition circuit terminal IGL1, multiplexer ADC-MUX is also set at channels VH_lim and VL_lim, or voltage source terminal VH_lim and voltage sink terminal VL_lim. For the voltage at voltage source terminal VH_lim the expected value is: VH_lim=VER−RH_lim×IH, where VER stands for the energy reserve voltage or the charge voltage of the energy reserve, RH_lim stands for the high-side current limiting resistor, and IH stands for the set current strength of high-side current source IH. For the voltage at voltage sink terminal VL_lim, the expected value is: VL_lim=RL_lim×IH, where RL_lim stands for the low-side current limiting resistor and IH stands for the set current strength of high-side current source IH. In the example calculation, VL_lim represents the voltage at voltage sink terminal VL_lim. If the measurement results deviate from the expected value to an extent greater than the specification, then the error processing unit produces an item of error information for the requesting microcontroller.

In the following, the reference characters of the components are also used for their values, i.e. voltages, currents, or resistances.

In an exemplary embodiment, the high-side current source, which feeds a measurement current, as a rule 40 mA . . . 60 mA, to the ignition circuit high side in order to determine the ignition circuit resistance, is connected to the high polarity reversal-protected (diode DH) energy reserve voltage 106 (24 . . . 42 V) via an ASIC-external current limiting resistor RH_lim. Current limiting resistor RH_lim for the polarity reversal-protected energy reserve voltage is dimensioned such that in the case of a defective (short-circuited) high-side current source IH in control device 104 (that is, an internal control device error) and also in the case of a short circuit in the ignition circuit 102 to vehicle ground (that is, an external error) an impermissibly high current (for example 100 mA . . . 150 mA) cannot flow via the ignition tablet.

Example:

At VER=33 V; VF=0.7 V; IZKmax=125 mA, there results RH_lim=32.3 V/125 mA=258 ohms. Here VF is the breakdown voltage of the diode DH.

In an exemplary embodiment, low-side current sink IL is dimensioned such that it can always accept somewhat more current than is fed back from high-side current source IH via first supply terminal ZK+ and the ignition circuit via the second supply terminal to low-side current sink IL, for example 50 mA . . . 70 mA. Here, a current limiting resistor RL_lim is to be inserted, external to the ASIC, between ground terminal GND of the control device and low-side current sink IL.

For the case of a short-circuited low-side current sink IL (i.e. an internal control device error), the current through the ignition tablet must remain below 100 mA . . . 150 mA even when there is a short circuit at first supply terminal CK+ to the vehicle plus (6 V . . . 16.5 V) (that is, an external error).

Example:

At VER=16.5 V; IZKmax=125 mA, there results RL_lim=16.5 V/125 mA=132 ohms.

Due to the high no-load voltage of high-side current source IH, with for example 24 V . . . 42 V, contact oxides can be loaded with significantly higher breakthrough field strengths than are usual today. If contacts are temporarily not conductive due to oxides, then by activation of high-side current source IH at first a voltage/field strength can be applied to the oxide layer, whereby this layer can be better broken down. If the breakdown occurs, then due to the limited measurement current the contact is further improved in its conductivity without overloading the channel (repair).

External limiting resistors RH_lim, RL_lim additionally reduce the power loss of high-side current source IH during the regular resistance measurement with Imess=IH=50 mA (or Imess in a range from 40 . . . 60 mA) through reduction of the maximum voltage Vqmax occurring over current source IH.

$$Vq\max = VER - VF - I\text{mess} * (RH\_lim + RL\_lim)$$

e.g. 33 V−0.7 V−50 mA (258+132)Ω=12.8 V.

Imess is the ignition tablet measurement current that is produced by current source IH, which produces currents of the quantity IH=Imess if no current drains through resistors, e.g. RHT, or other leakages exist.

By monitoring voltage VH_lim or voltage VL_lim during the ignition circuit resistance measurement, in addition the integrity of the external limiting resistors can be checked.

$$VH\_lim = VER - VF - I\text{mess} \times RH\_lim; \text{ for example}$$
$$VH\_lim = 33\ V - 0.7\ V - 50\ mA \times 258\Omega = 19.4\ V.$$

$$VL\_lim = I\text{mess} \times RL\_lim; \text{ for example } VL\_lim = 132\Omega \times 50\ mA = 6.6V.$$

Through pulse formation during activation of the high-side measurement current source, a current rise is produced corresponding to the raised cosine shape. In this way, the radiation in the vehicle from the ignition circuit loop, which is up to 10 m long, is reduced. Through stepwise increasing of the current output of measurement current source IH, the radiation can be further reduced.

The difference voltage between first supply terminal ZK+ and second supply terminal ZK− is acquired by an instrument amplifier. This amplifier has a very high common mode rejection, whereby the measurement of the difference voltage, caused by the measurement current at the ignition tablet of typically 100 mV, between first supply terminal ZK+ and second supply terminal ZK− is not falsified by the one high OFFSET voltage (approximately 6.6 V) (caused by limiting resistor RL_lim at voltage sink terminal VL_lim) at first supply terminal ZK+ and at second supply terminal ZK− to the control device ground terminal (Steuergerät-GND).

For the fine calibration of the already relatively precise measurement current IH, i.e. a current of high-side current source IH (for example 10%), of the relatively precise amplification V of the instrument amplifier (3%), of the low OFFSET (10 . . . 20 MB), in addition to the known control device-internal ignition circuit resistance ZKR (for example 10Ω, measurement range upper limit) connected to ignition circuit amplifier terminal ZKV, an offset terminal ZKO connected to control device ground terminal GND also makes sense. Through these connections, the relevant factor IH×V and the OFFSET can be finely calibrated at the beginning of a measurement cycle of n ignition circuits (see also FIG. 3).

Through the incorporation of a printed conductor segment in control device ground terminal GND of ignition circuit reference resistor ZKR connected to ignition circuit amplification terminal ZKV, which corresponds to the go and return of the ignition circuits on the circuit board of ASIC 104 to the device plug, and also to the connection of offset terminal ZKO (ASIC-PINS ZKO), not directly to the control device ground terminal (ECU-GND) but rather via a printed conductor segment, which also corresponds to the go and return of the ignition circuit on the circuit board, the resistance of the ignition circuit connection from the control device plug to the ASIC in the ignition circuit resistance measurement, which resistance becomes more and more significant and fluctuates due to temperature and circuit board manufacturing tolerances, is in addition compensated.

In an exemplary embodiment, the connection of first supply terminal ZK1+ and of second supply terminal ZK1− to instrument amplifier 108 as a first-order passive low-pass filter is carried out in order to keep away high interference frequencies (fg=500 kHz . . . 1.5 MHz). Instrument amplifier 180 itself is realized as an at least first-order active low-pass filter (fg=1 kHz . . . 10 kHz).

High-side current source IH and low-side current source IL with external current limiting resistors RH_lim, RL_lim can also be used to determine shunts, in particular to set their interior resistances, to the extent that current values can be set in a suitable current range with sufficiently small step width. New here is that, as is also the case in the ignition circuit resistance measurement, the effectiveness against contact oxides of the shunt circuit through the provision of a potential at the ignition circuit terminals is greater than in the case of ignition. In this way, a voltage gap in the monitoring band of the ignition circuit from 0 V to above the maximum ignition circuit voltage in the case of triggering (for example 30 V) can be excluded.

In order to increase robustness against radiation, the metering ignition circuit 102 can be connected to ground at voltage sink terminal VL_lim through an ASIC-internal (that is, situated inside control device 104) switchable terminating resistance. In this way, security against ignition circuit voltage errors remains ensured, and at the same time the robustness of the measurement is improved by discharging the ignition circuit loop before the measurement.

The disadvantage of the reduced measurement precision due to an imprecise ASIC-internal terminating resistor is remedied by disconnection immediately before the measurement. In order to acquire shunt internal resistances of 1 . . . 20 kiloohms, the high-side current source/low-side current sink are realized so as to be programmable with small current steps.

For example, high-side current source IH has a step width of 250 µA; 8-bit programming; maximum 63.75 mA=255*250 µA. For example, low-side current sink IL has a step width of 300 µA; 8-bit programming; maximum 76.5 mA=255*300 µA.

Optionally, to reduce the radiation relating to shunt measurement, this measurement can be carried out in such a way that in addition to a high-side current source IH at first supply terminal ZK+ a low-side current source IL at second supply terminal ZK− is also used. In this way, in the shunt measurement to ground GND in the error-free state of the ignition circuits, currents over the ignition circuit loop for charging the ignition circuit capacitor on the ignition circuit side are avoided to the greatest possible extent.

Figure 2:
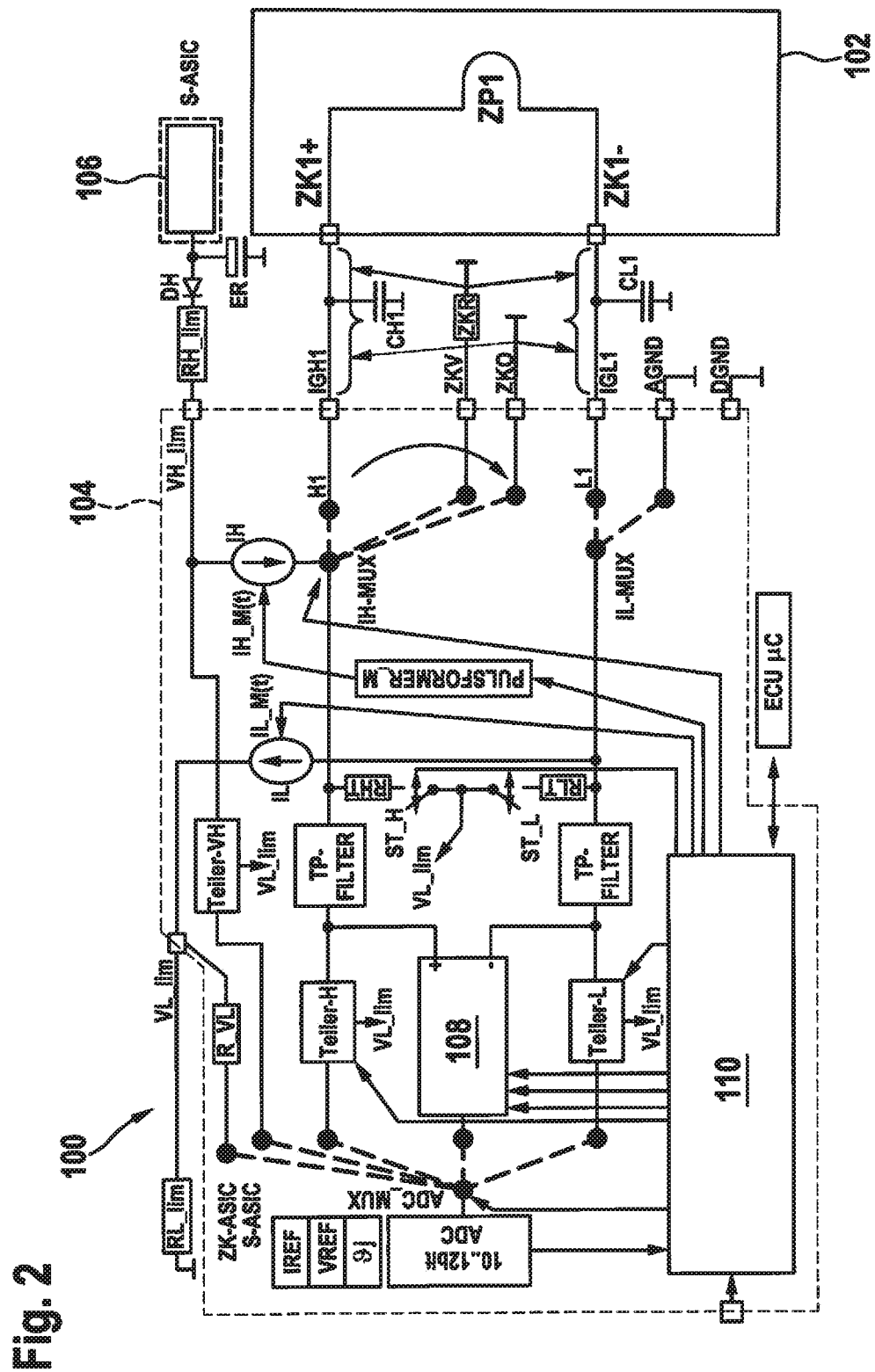

FIG. 2 shows a simplified circuit diagram of a monitoring device 100 according to an exemplary embodiment of the present invention. The depiction in FIG. 2 largely corresponds to that in FIG. 1, with the difference of the connection to ignition circuit amplifier terminal ZKV and to offset terminal ZKO.

In the exemplary embodiment shown in FIG. 2, a segment of printed conductor can additionally be inserted into the ground connection of ignition circuit reference resistance ZKR, corresponding to the go and return of the ignition circuit on the circuit board. Likewise, the connection of offset terminal ZKO is not to be made directly to control device ground terminal ECU-GND, but rather also via a segment of printed conductor that also corresponds to the go and return of ignition circuit 102 on the circuit board. With this measure, the fine calibration also includes the connection, which is temperature-dependent and whose thickness and/or width fluctuates, of the ignition circuit terminals to the control device plug via (copper) printed conductors on a circuit board. In this way, it is possible to build very compact control devices using minimal printed conductor widths of the ignition circuit connection.

Conventional devices must increase the printed conductor width of ignition circuits 100 far beyond the current carrying limit in order to keep the resistance values low enough that these fluctuations do not too strongly falsify the ignition circuit resistance measurement. In airbag systems having a large number of ignition circuits, this results in a large space requirement and inadequate use of circuit board interior layers having small copper thicknesses.

In the exemplary embodiment shown in FIG. 2, an integrity test of the current limiting resistor RH_lim, RL_lim can be carried out. For the initial testing of the integrity of limiting resistance RH_lim, high-side multiplexer IH_MUX is set at offset terminal ZKO and ADC multiplexer ADC MUX is set at voltage divider Teiler_VH. ADC measurement value 1 (ADC_MW1) provides a voltage at voltage source terminal VH_lim; in the error-free case, this corresponds to voltage VER-VF. High-side voltage source IH is then increased in steps, with a raised cosine current rise, to for example 50 mA, and the voltage at voltage source terminal VH_lim is again acquired via the voltage divider with analog-digital converter ADC=ADC measurement value 2, or ADC_MW2. The external limiting resistance RH_lim can be tested for its permissible limits using the calculation (ADC_MW1−ADC_MW2)/50 mA=RH_lim.

The testing of the integrity of limiting resistance RL_lim can be carried out in the course of each resistance measurement, or in "diluted" fashion can be carried out at each n-th resistance measurement. For this purpose, a specific measurement current is used that supplies, at voltage sink terminal VL_lim, a voltage that can be acquired without a voltage divider only via a protection resistor R_VL. If, given stepwise increase, high-side current source IH reaches a value of for example IH=10 mA, voltage sink terminal VL_lim is measured via protection resistor R_VL of analog-digital converter ADC as first measurement value ADC_MW1. From this there results ADC_MW1/IH=RL_lim; in this way, the external limiting resistor RL_lim can be tested for its permissible limits.

Figure 3:
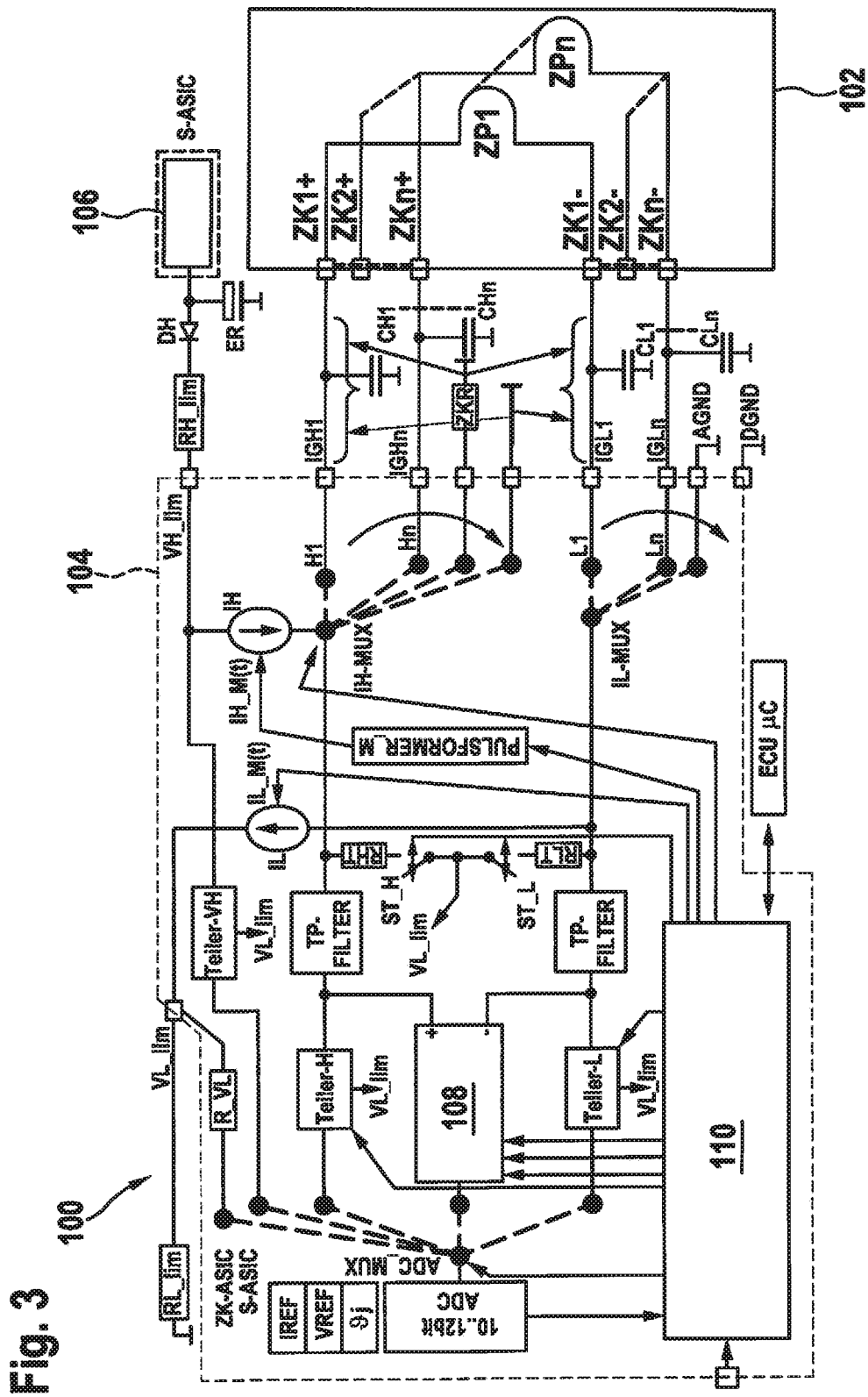

FIG. 3 shows a simplified circuit diagram of a monitoring device 100 according to an exemplary embodiment of the present invention. The depiction in FIG. 3 corresponds largely to the depiction FIG. 2, a multiplicity of ignition circuits 102 being monitored. Shown are a first ignition circuit ZK1, a second ignition circuit ZK2, and a n-th ignition circuit ZKn, with corresponding supply terminals ZK1+, ZK1−, ZK2+, ZK2−, ZKn+, ZKn−, and the corresponding high-side ignition circuit terminals IGH1 . . . IGHn or low-side ignition circuit terminals IGL1 . . . IGLn.

The exemplary embodiment shown in FIG. 3 expands the realizations of the exemplary embodiments shown in FIG. 1 and FIG. 2 to n ignition circuits. In FIG. 3, the relevant areas of an airbag system ASIC 102 or ignition circuit ASIC 102 are shown. These are intended to carry out the ignition circuit monitoring of n ignition circuits (ZKn). These ignition circuits each have a first supply terminal (ZKn+) and a second supply terminal (ZK−). In addition, a control device-internal (ECU-internal) ASIC terminal is provided for OFFSET calibration (offset terminal ZKo). The known amplification calibration takes place via ignition circuit amplification terminal ZKV via reference ignition circuit resistance ZKR.

The circuit connection at offset terminal ZKO and ignition circuit amplification terminal ZKV can take place corresponding to the exemplary embodiments shown in FIG. 1 and FIG. 2. The resistance of the external ignition circuit loops is to be determined, and a monitoring is to be carried out. For this purpose, in addition a fine calibration is carried out, corresponding to the statements made above, in order to determine OFFSET and overall amplification (IH×V).

High-side multiplexer IH-MUX connects high-side current source IH to high-side ignition circuit terminals IGH1 . . . IGHn, offset terminal ZKO, ignition circuit amplification terminal ZKV and also to low-side ignition circuit terminals IGL1 . . . IGLn for the expanded shunt measurement when the ignition circuit is open (not shown in FIG. 3). Low-side multiplexer IL-MUX connects current sink IL to low-side ignition circuit terminals IGL1 . . . IGLn and to analog ground terminal AGND for the calibration of the measuring device and also to high-side ignition circuit terminals IGH1 . . . IGHn for expanded shunt measurement when the ignition circuit can is open (not shown in FIG. 3).

High-side current source IH is supplied with power via current-limited voltage source terminal VH_lim. For the current limiting, an ASIC-external resistance RH_lim is connected in polarity reversal-protected fashion to the highest airbag voltage VER of the energy reserve. This resistor limits the current from highest airbag voltage VER via a defective high-side current source IH against a shunt at one of ignition circuits 1 . . . n. In the case of an ignition circuit short-circuit, the polarity reversal protection (diode DH) does not permit a reverse current to the supply plus via a high-side current source IH realized as a MOSFET.

Current sink IL is connected via voltage sink terminal VL_lim to control device ground terminal ECU-GND via ASIC-external resistor RL_lim. This resistor limits the current caused by a shunt at one of the ignition circuits 1 . . . n against the positive vehicle voltage in the case of a defective current sink. The temporal course of the current rise in the transition from a first current level to a second current level is determined by current source control device Pulsformer_H and current source control device Pulsformer L as a raised cosine. Through the current programming, for example 8 bits in width, the setting of the measurement current can take place in small steps.

The IL-MUX output can be connected, via a switchable terminating resistor RHT (e.g. 5 kiloohm . . . 20 kiloohm), to voltage sink terminal VL_lim. In this way, charges coupled in before the ignition circuit measurement can be discharged to the ignition circuit capacitors. The measurement error caused by the increased tolerance of integrated, uncalibrated resistances is remedied by disconnection of terminating resistor RHT using switch ST_H.

The IL-MUX output can be connected to the voltage sink terminal VL_lim via a switchable terminating resistor RLT (e.g. 5 kiloohm . . . 20 kiloohm). In this way, charges coupled in before the ignition circuit measurement can be discharged to the ignition circuit capacitors. The measurement error caused by the increased tolerance of integrated, uncalibrated resistances is remedied by disconnection of terminating resistor RHT using switch ST_L. In addition, the IH-MUX output is connected to an input of a passive low-pass filter TP-FILTER_H (e.g. fg=500 kHz . . . 1.5 MHz). Here, radio-frequency ignition circuit disturbances are kept away from the plus input of the instrument amplifier.

In addition, the IL-MUX output is connected to an input of a passive low-pass filter TP-FILTER_L (e.g. fg=500 kHz . . . 1.5 MHz). Here, high-frequency ignition circuit interference is kept away from the minus input of instrument amplifier 108.

The output of passive low-pass filter TP-FILTER_H is connected to the plus input of instrument amplifier 108. The output of passive low-pass filter TP-FILTER_L is connected to the minus input of instrument amplifier 108. The output of passive low-pass filter TP-FILTER_H is in addition connected to an input of a programmable voltage divider TEILER_H, programmable voltage divider TEILER_H having a reference to voltage sink terminal VL_lim, i.e. a limited ground reference. The output of passive low-pass filter TP FILTER_L is in addition connected to the input of a programmable voltage divider TEILER_L, programmable voltage divider TEILER+L having a reference to voltage sink terminal VL_lim, i.e. a limited ground reference. Voltage dividers TEILER_H, TEILER_L adapt the measurement range of ASIC-internal analog-digital converter ADC of for example 0 . . . 3.75 V to the external measurement voltage range of for example 0 . . . 42 V.

The divider outputs of voltage dividers TEILER_H, TEILER_L are connected to inputs of ADC multiplexer ADC-MUX. Likewise, the instrument amplifier output is connected to an input of ADC multiplexer ADC-MUX. To determine the integrity of limiting resistors RH_lim and RL_lim, the voltages at voltage source terminal VH_lim and voltage sink terminal VL_lim are connected to ADC multiplexer ADC_MUX via voltage divider Teiler_VH, or via integrated protection resistor R_VL. Additional inputs of the analog-digital converter, not relevant for this exemplary embodiment or this expansion, are not shown here. Simple errors in programmable dividers Teiler_H, Teiler_L, Teiler VH are detectable, and, despite reference to control device ground terminal ECU-GND, do not result in critical currents in connected ignition circuits in the case of external ignition circuit errors to vehicle voltage, because at least two ASIC-internal resistors are configured in series.

The output of ADC multiplexer ADC-MUX is connected to the input of the analog-digital converter. The analog-digital converter provides its digital voltage values to semiautomatic ignition circuit measurement control unit 110 with processing and error recognition.

Semiautomatic ignition circuit measurement control unit 110 in turn receives various measurement tasks via an interface to an ASIC-external microcontroller μC. After the processing of the measurement request by ignition circuit measurement control unit 110, the measurement value processing, and an error evaluation, microcontroller μC receives the result "passed" or "not passed." Via the interface to microcontroller μC there also takes place the programming of the measurement parameters, such as:
measurement current strength and the error limits for the ignition circuit resistance measurement,
error limits for the ignition circuit resistance measurement, such as 1 ohm for too low, and 6.5 ohms for too high,
error limits for the resistance measurement in the reference ignition circuit,
error limits for a shunt in the reference ignition circuit,
the internal resistance measurement of the ignition circuit shunts to ground, or internal resistance measurement of the ignition circuit shunts to vehicle voltage, for example 3 kiloohms for too low,
the ignition circuit voltage level for recognition of shunt to ground, or to vehicle voltage,
error limits for limiting resistors RL_lim; RH_lim, and voltages VL_lim, VH_lim at the corresponding terminals voltage sink terminal VL_lim, voltage source terminal VH_lim,
identification of the ignition circuits that are to be measured,
indications of the measurement frequency.

In an exemplary embodiment, an ignition circuit resistance measurement at an ignition circuit ZKn has the following sequence:
terminating resistor RHT is connected to voltage sink terminal VL_lim (limited control device ground terminal ECU-GND) via switch ST_H,
terminating resistor RLT is connected to voltage sink terminal VL_lim (limited control device ground terminal ECU-GND) via switch ST_L,
there subsequently follows a waiting period of for example 5 ms,
ASIC control unit 110 sets multiplexer IH-MUX at terminal IGHn,
ASIC control unit 110 sets multiplexer IL-MUX at terminal IGLn,
ASIC control unit 110 sets ADC multiplexer ADC-MUX at instrument amplifier 108,
current sink IL is activated and is programmed for a current limiting to voltage sink terminal VL_lim of 60 mA,
high-side current source IH is activated and the current is increased in steps with a raised cosine edge, for example in 10 steps of for example 5 mA, to 50 mA,
the step interval is for example 100 μs,
after reaching the final measurement current level of 50 mA, terminating resistors RHT, RLT are disconnected or separated from voltage sink terminal VL_lim using switches ST_H, ST_L,
Teiler_H and Teiler_L are disconnected or separated from voltage sink terminal VL_lim,
there then follows a waiting period of for example 1 ms (as a function of the low-pass cutoff frequency in the measurement chain),
the difference voltage signal between terminals IGHn and IGLn is now supplied via a low-pass filter to instrument amplifier 108 with for example a sixfold amplification, and the amplified and again low-pass filtered output signal is supplied to analog-digital converter ADC,
analog-digital converter ADC transmits the digital measurement value (ADC measurement value) into the measurement value register of ASIC measurement value processing unit 110. While measurement value processing 110 is running, the measurement of the next ignition circuit resistance can already be started.

Using the knowledge of the measurement current strength and the amplification of instrument amplifier 108, ASIC measurement value processing unit 110 calculates the ignition circuit resistance from the signal of analog-digital converter ADC.

In an exemplary embodiment, the ADC measurement value=400 digits (ADC reference voltage for example 3.75 V; 10-bit ADC yields 3.666 mV/digit). 400 digits corresponds to 1466.4 mV. With sixfold amplification, the voltage difference between IGHn and IGLn is 244.4 mV. At a nominal measurement current of 50 mA, there results an ignition circuit resistance n=4.888 ohm.

As described in FIG. 1 and FIG. 2, the measurement precision can be improved by a fine calibration.

After the ascertaining of the ignition circuit resistance, there takes place a test against specified limits.

Figure 4:
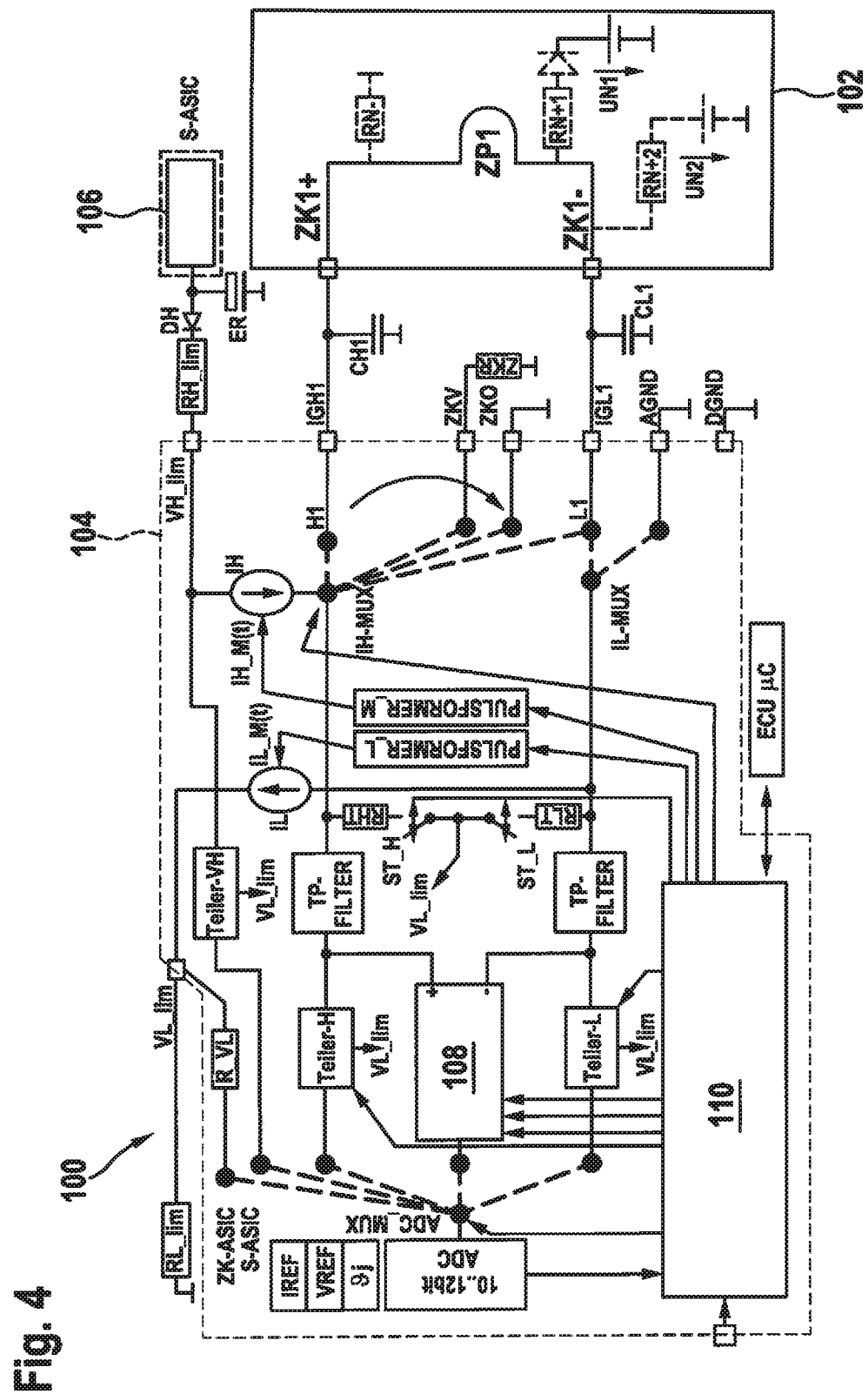

FIG. 4 shows a simplified circuit diagram of a monitoring device 100 according to an exemplary embodiment of the present invention. The exemplary embodiment shown in FIG. 4 expands the exemplary embodiment shown in FIG. 1 for acquiring shunts by programmable high-side current source IH and programmable current sink IL.

For testing a shunt to ground GND at first supply terminal ZK1+ or second supply terminal ZK1−, high-side current source IH is increased, step-by-step, by 250 μA, until the voltage at first supply terminal ZK1+ has reached a specified value, for example 15 V. This specified value represents the maximum ignition circuit voltage against control device ground terminal ECU-GND in the case of ignition with maximum ignition circuit resistance and forward bias of a coupling diode. The current required to reach this value is acquired (as long as it is below approximately 60 mA) and is determined by 15 V/IH of shunt resistor RN−.

Example:

IH=1 mA@VH=15V; there results: Rn−=15 kΩ.

If what is concerned is a shunt against a voltage, for example 12 V, coupled via a diode, then the voltage at first supply terminal ZK1+ jumps, when there is stepwise increasing of the current of high-side current source IH, by the amount of the shunt voltage (here UN1=12V), and further increases by IH×RN+1. In this case, shunt voltage UN1 and shunt resistance RN+1 are ascertained and are checked for error limits.

To test a shunt to Fahrzeug_Plus (vehicle_plus) at first supply terminal ZK1+ or or second supply terminal ZK1−, first the voltage at first supply terminal ZK1+ is acquired via voltage divider Teiler_H by analog-digital converter ADC (ADC_MW1), and subsequently current sink IL is increased step-by-step by 300 μA until the ZK1+ voltage at first supply terminal ZK1+ has reached the value of for example 3 V: (this value represents the maximum ground offset between control device ground terminal ECU-GND and chassis GND) with [ADC_MW1−ADC_MW2 (approximately 3 V)]/IL (@ZK1+ approximately 3 V)=RN+ shunt resistance RN+2 to Fahrzeug_Plus is ascertained. Voltage value ADC_MW1 represents shunt voltage UN2.

An aspect of the presented ignition circuit monitoring is the use of a high (regarded relatively) measurement voltage, a stepped current increase, and a flank formation using suitable control devices. Here, specific circuit elements are provided for increasing security and precision.

Figure 5:
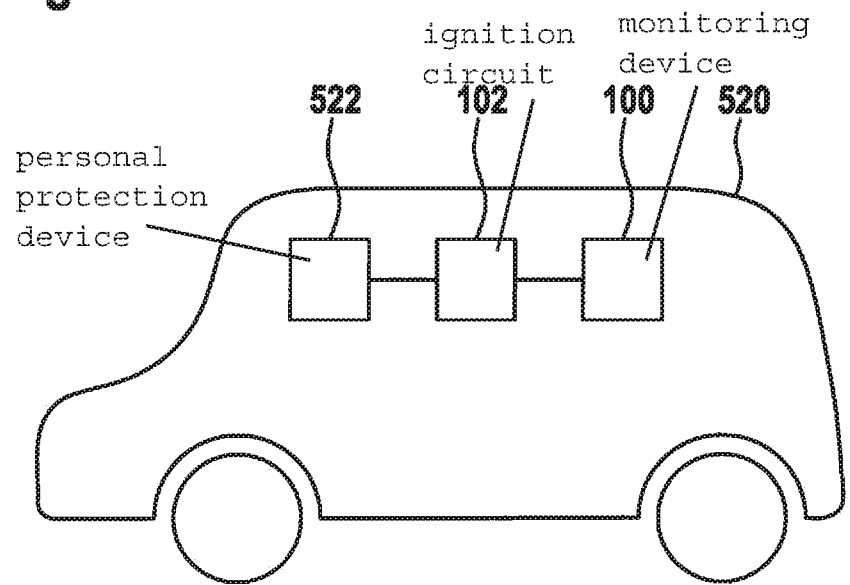
FIG. 5 shows a schematic representation of a vehicle having a personal protection device and a monitoring device according to an exemplary embodiment of the present invention.

FIG. 5 shows a schematic representation of a vehicle 520 having a personal protection device 522 and having a monitoring device 100 according to an exemplary embodiment of the present invention. Vehicle 500 shown in FIG. 5 has a personal protection device 522 such as an airbag 522 that can be triggered via an ignition circuit 102. Ignition circuit 102 can be monitored by monitoring device 100. Here, monitoring device 100 can be a variant of a monitoring device 100 shown in the preceding Figures.

Figure 6:
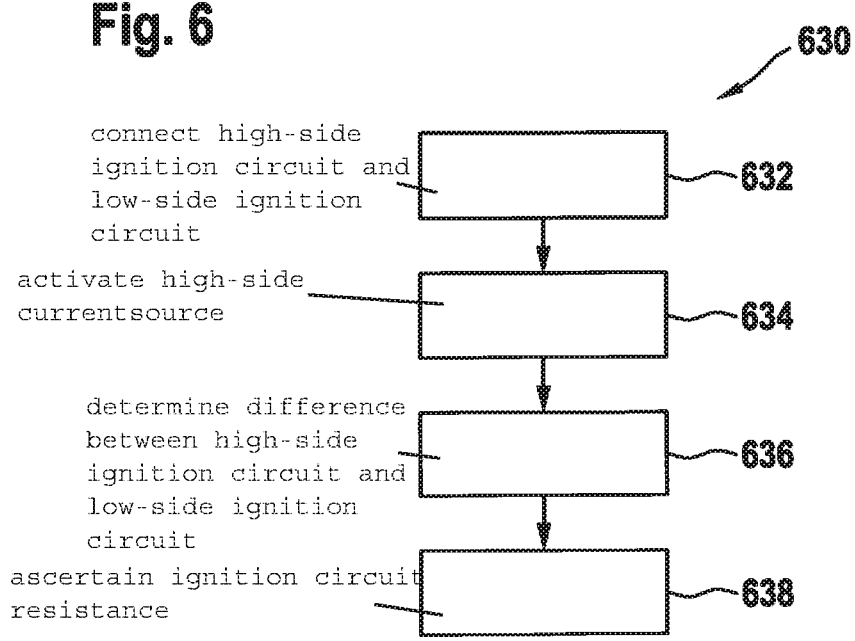
FIG. 6 shows a flow diagram of a method according to an exemplary embodiment of the present invention.

FIG. 6 shows a flow diagram of a method 630 according to an exemplary embodiment of the present invention. The method for operating a variant of a monitoring device described in FIG. 1 through FIG. 5 includes, in the exemplary embodiment shown in FIG. 6, a step 632 of connection in which high-side ignition circuit terminal IGH1 is connected to high-side current source IH and low-side ignition circuit terminal IGL1 is connected to a voltage sink terminal VL_lim. In a following step 634 of activation, high-side current source IH is activated. In a step 636 of determining, following step 634 of activation, a difference voltage signal between high-side ignition circuit terminal IGH1 and low-side ignition circuit terminal IGL1 is determined, which in a terminating step 638 of ascertaining is used to ascertain an ignition circuit resistance.

Method 630 for operating the monitoring device can be expanded by individual method steps already presented in the description relating to FIG. 1. This is also partly a function of the variant of the monitoring device being controlled. In an exemplary embodiment, method 630 can be realized in digital block 110, or control device 110, shown in FIG. 1 through FIG. 4.

The exemplary embodiments described and shown in the Figures have been selected only as examples. Different exemplary embodiments can be combined with one another in their entirety or with regard to individual features. An exemplary embodiment can also be supplemented with features of another exemplary embodiment.

In addition, the method steps presented here can be repeated, or can be carried out in a sequence differing from that described.

If an exemplary embodiment includes an "and/or" linkage between a first feature and a second feature, this is to be read as meaning that according to a specific embodiment the exemplary embodiment has both the first feature and the second feature, and according to a further specific embodiment the exemplary embodiment has either only the first feature or only the second feature.

What is claimed is:

1. A monitoring device for at least one ignition circuit for a personal protection device for a vehicle, the at least one ignition circuit designed to activate the personal protection device when at least one of: i) an ignition voltage is present that exceeds a voltage threshold value, and ii) an ignition current is present that exceeds a current threshold value, the monitoring device comprising:
    a control device; and
    a voltage source connected via a voltage source terminal of the control device, the control device being connected via a high-side ignition circuit terminal to a first supply terminal of the ignition circuit and via a low-side ignition circuit terminal to a second supply terminal of the ignition circuit;
    wherein the monitoring device designed such that a no-load voltage of a high-side current source of the control device situated between the voltage source terminal and the high-side ignition circuit terminal corresponds at least to the voltage threshold value, the no-load voltage corresponding at least to a maximum ignition voltage of the ignition circuit.

2. The monitoring device as recited in claim 1, wherein the no-load voltage of the high-side current source is at least 26 V.

3. The monitoring device as recited in claim 1, wherein the no-load voltage of the high-side current source is at least 30 V.

4. The monitoring device as recited in claim 1, wherein the no-load voltage of the high-side current source is at least 42 V.

5. The monitoring device as recited in claim 1, further comprising:
a current source control device designed to control a temporal course of a current rise of the high-side current source in the transition from a first current level to a second current level corresponding to a predefined transition shape, the current source control device being designed to control the temporal course of the current rise corresponding to a transition shape with a raised cosine curve.

6. The monitoring device as recited in claim 1, further comprising:
a filter device for filtering at least a measurement voltage, the filter device in including at least one low-pass filter.

7. The monitoring device as recited in claim 1, further comprising:
an analog-digital converter connected via an ADC multiplexer to an instrument amplifier for measuring a voltage via a low-pass filter between the high-side ignition circuit terminal and the low-side ignition circuit terminal for the at least one ignition circuit and between an ignition circuit amplifier terminal and an analog ground terminal, or between an offset terminal and the analog ground terminal.

8. The monitoring device as recited in claim 1, further comprising:
at least one of; i) a current limiting resistor between the voltage source and the voltage source terminal, and ii) a current limiting resistor between the ground terminal and a voltage sink terminal.

9. The monitoring device as recited in claim 1, further comprising:
at least one of: i) a switchable high-side terminating resistor, and ii) a switchable low-side terminating resistor.

10. The monitoring device as recited in claim 1, further comprising: at least one of: i) a switchable high-side terminating resistor situated between an output of a high-side multiplexer connected to the high-side current source and a voltage sink terminal, and ii) a switchable low-side terminating resistor situated between an output of a low-side multiplexer connected to the low-side ignition circuit terminal and the voltage sink terminal.

11. The monitoring device as recited in claim 1, further comprising:
at least one of: i) a switchable high-side voltage divider, and ii) a switchable low-side voltage divider.

12. The monitoring device as recited in claim 1, further comprising:
at least one of: i) a switchable high-side voltage divider situated between an output of a high-side multiplexer connected to the high-side current source and an ADC-multiplexer connected to an analog-digital converter, and ii) a switchable low-side voltage divider situated between an output of a low-side multiplexer connected to the low-side ignition circuit terminal and the ADC multiplexer.

13. The monitoring device as recited in claim 1, further comprising:
a polarity reversal protection diode between and an output capacitor of the voltage source in series to the current limiting resistor.

14. A method for operating a monitoring device for at least one ignition circuit for a personal protection device for a vehicle, the at least one ignition circuit designed to activate the personal protection device when at least one of: i) an ignition voltage is present that exceeds a voltage threshold value, and ii) an ignition current is present that exceeds a current threshold value, the monitoring device including a control device, and a voltage source connected via a voltage source terminal of the control device, the control device being connected via a high-side ignition circuit terminal to a first supply terminal of the ignition circuit and via a low-side ignition circuit terminal to a second supply terminal of the ignition circuit, wherein the monitoring device designed such that a no-load voltage of a high-side current source of the control device situated between the voltage source terminal and the high-side ignition circuit terminal corresponds at least to the voltage threshold value, the no-load voltage corresponding at least to a maximum ignition voltage of the ignition circuit, the method comprising:
connecting the high-side ignition circuit terminal to the high-side current source, a and connecting the low-side ignition circuit terminal to a voltage sink terminal;
activating the high-side current source;
determining a difference voltage signal between the high-side ignition circuit terminal and the low-side ignition circuit terminal; and
ascertaining an ignition circuit resistance using the difference voltage signal.

15. A control device for operating a monitoring device for at least one ignition circuit for a personal protection device for a vehicle, the at least one ignition circuit designed to activate the personal protection device when at least one of: i) an ignition voltage is present that exceeds a voltage threshold value, and ii) an ignition current is present that exceeds a current threshold value, the monitoring device including a control device, and a voltage source connected via a voltage source terminal of the control device, the control device being connected via a high-side ignition circuit terminal to a first supply terminal of the ignition circuit and via a low-side ignition circuit terminal to a second supply terminal of the ignition circuit, wherein the monitoring device designed such that a no-load voltage of a high-side current source of the control device situated between the voltage source terminal and the high-side ignition circuit terminal corresponds at least to the voltage threshold value, the no-load voltage corresponding at least to a maximum ignition voltage of the ignition circuit, the control device configured to:
connect the high-side ignition circuit terminal to the high-side current source, a and connect the low-side ignition circuit terminal to a voltage sink terminal;
activate the high-side current source;
determine a difference voltage signal between the high-side ignition circuit terminal and the low-side ignition circuit terminal; and
ascertain an ignition circuit resistance using the difference voltage signal.

16. A non-transitory computer readable storage medium on which is stored a computer program for operating a monitoring device for at least one ignition circuit for a personal protection device for a vehicle, the at least one ignition circuit designed to activate the personal protection device when at least one of: i) an ignition voltage is present that exceeds a voltage threshold value, and ii) an ignition current is present that exceeds a current threshold value, the monitoring device including a control device, and a voltage source connected via a voltage source terminal of the control device, the control device being connected via a high-side ignition circuit terminal to a first supply terminal of the ignition circuit and via a low-side ignition circuit terminal to a second supply terminal of the ignition circuit, wherein the monitoring device designed such that a no-load voltage of a high-side current source of the control device situated between the voltage source terminal and the high-side ignition circuit terminal corresponds at least to the voltage threshold value, the no-load voltage corresponding at least to a maximum ignition voltage of the ignition circuit, the computer program, when executed by a computer, causing the computer to perform:

- connecting the high-side ignition circuit terminal to the high-side current source, a and connecting the low-side ignition circuit terminal to a voltage sink terminal;
- activating the high-side current source;
- determining a difference voltage signal between the high-side ignition circuit terminal and the low-side ignition circuit terminal; and
- ascertaining an ignition circuit resistance using the difference voltage signal.

* * * * *